(12) United States Patent
Kim

(10) Patent No.: US 12,395,528 B2
(45) Date of Patent: Aug. 19, 2025

(54) APPARATUS AND METHOD FOR PROTECTING PERSONAL INFORMATION LEAKED BY PHISHING APPLICATION

(71) Applicant: LAVARWAVE.INC, Seoul (KR)

(72) Inventor: Jun Yeop Kim, Gwacheon-si (KR)

(73) Assignee: LAVARWAVE.INC, Seoul (KR)

( * ) Notice: Subject to any disclaimer, the term of this patent is extended or adjusted under 35 U.S.C. 154(b) by 311 days.

(21) Appl. No.: 18/265,679

(22) PCT Filed: Oct. 27, 2020

(86) PCT No.: PCT/KR2020/014696
§ 371 (c)(1),
(2) Date: Jun. 7, 2023

(87) PCT Pub. No.: WO2022/025349
PCT Pub. Date: Feb. 3, 2022

(65) Prior Publication Data
US 2024/0031405 A1 Jan. 25, 2024

(30) Foreign Application Priority Data
Jul. 31, 2020 (KR) .......................... 10-2020-0096382

(51) Int. Cl.
*H04L 9/40* (2022.01)
*G06F 21/62* (2013.01)

(52) U.S. Cl.
CPC ...... *H04L 63/1483* (2013.01); *G06F 21/6245* (2013.01)

(58) Field of Classification Search
CPC ............. H04L 63/1483; H04L 63/1491; G06F 21/6245; G06F 21/56; G06F 21/6227
See application file for complete search history.

(56) References Cited

U.S. PATENT DOCUMENTS 10,686,826 B1 * 6/2020 Goutal ................ G06F 18/2323
11,470,113 B1 * 10/2022 Orhan ................. H04L 63/1425
2007/0005984 A1 * 1/2007 Florencio ............. H04L 9/3226
713/178

FOREIGN PATENT DOCUMENTS

KR 10-2013-0080831 A 7/2013
KR 10-2015-0024044 A 3/2015
(Continued)

OTHER PUBLICATIONS

International Search Report for PCT/KR2020/014696 mailed Apr. 15, 2021 from Korean Intellectual Property Office.

*Primary Examiner* — Thaddeus J Plecha
(74) *Attorney, Agent, or Firm* — Revolution IP, PLLC

(57) ABSTRACT

A method for protecting personal information leaked by the phishing application includes a first step of extracting phishing server information, which is server information of a phishing application installed in a customer terminal, by decompiling a file related to the phishing application from which personal information was leaked, a second step of collecting customer-related information by accessing a phishing server through the phishing server information and scanning information included in a database, a third step of generating dummy data by performing falsification with random data so as to conform to a data format of the database of the phishing server based on the collected customer-related information, a fourth step of neutralizing personal information leakage by transmitting the dummy data to the phishing server.

8 Claims, 8 Drawing Sheets

(56) References Cited

FOREIGN PATENT DOCUMENTS

| KR | 10-2015-0123543 A | 11/2015 |
| KR | 10-1733633 B1 | 5/2017 |
| KR | 10-2018-0013256 A | 2/2018 |

* cited by examiner

FIG. 5

```
private void addTel(String paramString)
{
    HashMap localHashMap = new HashMap();
    localHashMap.put("key", "2966272e00e29...");
    localHashMap.put("str", paramString);
    Log.e("RegisterActivity", localHashMap.toString());
    VolleyRequest.RequestPost(this, "tcp:60077/api/add_tel", "add_tel", localHashMap, new VolleyInterface(this)
    {
        public void onMyError(VolleyError paramAnonymousVolleyError)
        {
            paramAnonymousVolleyError.printStackTrace();
        } public void onMySuccess(String paramAnonymousString)
        {
            Log.e("RegisterActivity", paramAnonymousString);
            try
            {
                if (!"1".equals(String.valueOf(((CodeBean)new Gson().fromJson(paramAnonymousString, CodeBean.class)).getCode())));
                return;
            }
            catch (Exception paramAnonymousString)
            {
                paramAnonymousString.printStackTrace();
            }
        }
    });
}
```

APPARATUS AND METHOD FOR PROTECTING PERSONAL INFORMATION LEAKED BY PHISHING APPLICATION

TECHNICAL FIELD

The present invention relates to an apparatus and method for protecting personal information leaked by a phishing application, and more specifically, to an apparatus and method for protecting personal information leaked by a phishing application capable of neutralizing leakage of personal information by decompiling the phishing application, accessing a phishing server, collecting leaked customer's personal information, and substituting or combining the leaked customer's personal information with dummy data when customer's personal information is leaked through the phishing application.

BACKGROUND ART

Recently, the spread of communication terminal devices that perform smart phone functions by applying mobile operating systems such as windows mobile, i-OS (operating system), and Android has been activated.

In the communication terminal device to which such a mobile operating system is applied, various information processing services are provided to users by executing various application programs based on a corresponding mobile operating system.

In addition, the communication terminal device to which the mobile operating system is applied is installed with a browser as an application program, and provides information on various websites to users by running the browser and accessing Internet websites through communication.

The communication terminal device to which such a mobile operating system is applied frequently attempts to establish communication access to the website by executing the application program based on a URL imported when receiving a text message, receiving a multimedia message, receiving an e-mail, or transacting contents.

However, in communication access to the website based on the URL received in this way, whether or not a site to be accessed is harmful is not checked, and thus communication access to harmful sites such as a phishing site, domestic and foreign obscene sites, and a speculative site may occur.

Among communication access to harmful sites, access to the phishing site is becoming a social problem because it often leads to financial crimes. For example, when the text message includes URL information that induces access to the phishing site disguised as a financial institution, the communication terminal device can easily access the phishing site according to the URL information, and cases in which personal information is leaked by such a phishing site frequently occur.

In the prior art, there are techniques for blocking a harmful short message, etc. received by the communication terminal device or techniques for blocking access to the phishing site by URL information included in the harmful short message, but there is a problem in that there is no method to deal with the case where personal information has already been leaked by a phishing application.

DISCLOSURE OF THE INVENTION

Technical Problem

Accordingly, an object of the present invention is to provide an apparatus and method for protecting personal information leaked by a phishing application that can overcome the conventional problems described above.

Another object of the present invention is to prevent the illegal distribution of personal information by replacing or falsifying leaked personal information with dummy data even when personal information is leaked by a phishing application, and is to provide an apparatus and method for protecting personal information leaked by a phishing application.

Technical Solution

According to an embodiment of the present invention for achieving some of the technical problems described above, a method for protecting personal information leaked by a phishing application according to the present invention, includes a first step of extracting phishing server information, which is server information of a phishing application installed in a customer terminal, by decompiling a file related to the phishing application from which personal information was leaked, a second step of collecting customer-related information by accessing a phishing server through the phishing server information and scanning information included in a database, a third step of generating dummy data by performing falsification with random data so as to conform to a data format of the database of the phishing server based on the collected customer-related information, a fourth step of neutralizing personal information leakage by transmitting the dummy data to the phishing serve r so that customer's personal information is replaced with the dummy data or so that the dummy data is combined with the leaked customer's personal information to falsify the leaked customer's personal information.

The phishing server information may include at least one of virtual private server (VPS) information, command & control (C&C) server information, an IP address, an access route, and log transmission contents.

In the second step, the collecting the information related to the customer may be performed in a manner of checking whether or not the information is matched with customer information including at least one of GPS location information, phishing time information, customer's phone number, international mobile equipment identity (IMEI) of a customer's terminal, SMS data of the customer's terminal, photo stored in the customer's terminal, and contacts and collecting matching information.

The dummy data may include at least one of a photo in which it is impossible to discern or identify who it is, contacts in unused phone number format, a document containing meaningless content, unidentifiable SMS data, falsified phishing time information, and an international mobile equipment identity of a falsified customer terminal.

According to another embodiment of the present invention for achieving some of the technical problems described above, an apparatus for protecting personal information leaked by a phishing application according to the present invention includes an information extraction unit that extracts phishing server information, which is server information of a phishing application installed in a customer terminal, by decompiling a file related to the phishing application from which personal information was leaked, an information collection unit that collects customer-related information by accessing a phishing server through the phishing server information and scanning information included in a database, a dummy data generation unit that generates dummy data by performing falsification with random data so as to conform to a data format of the database of the phishing server based on the collected customer-related information, a data falsification unit that neutralizes personal information leakage by transmitting the dummy data to the phishing server so that customer's personal information is replaced with the dummy data or so that the dummy data is combined with the leaked customer's personal information to falsify the leaked customer's personal information.

The phishing server information may include at least one of virtual private server (VPS) information, command & control (C&C) server information, an IP address, an access route, and log transmission contents.

In the information collection unit, the collection of information related to the customer may be performed in a manner of checking whether or not the information is matched with customer information including at least one of GPS location information, phishing time information, customer's phone number, international mobile equipment identity (IMEI) of a customer's terminal, SMS data of the customer's terminal, photo stored in the customer's terminal, and contacts and collecting matching information.

The dummy data may include at least one of a photo in which it is impossible to discern or identify who it is, contacts in unused phone number format, a document containing meaningless content, unidentifiable SMS data, falsified phishing time information, and an international mobile equipment identity of a falsified customer terminal.

Advantageous Effects

According to the present invention, there is an advantage in that, even if personal information is temporarily leaked by a phishing application, leakage of personal information can be prevented and the leaked personal information can be protected by replacing or falsifying the leaked personal information with dummy data in a short time.

BRIEF DESCRIPTION OF THE DRAWINGS

FIGS. 5 to 7 are diagrams illustrating examples of collected customer information.

MODE FOR CARRYING OUT THE INVENTION

Hereinafter, preferred embodiments of the present invention will be described in detail with reference to the accompanying drawings, without any intention other than to provide a thorough understanding of the present invention to those skilled in the art to which the present invention pertains.

Figure 1:
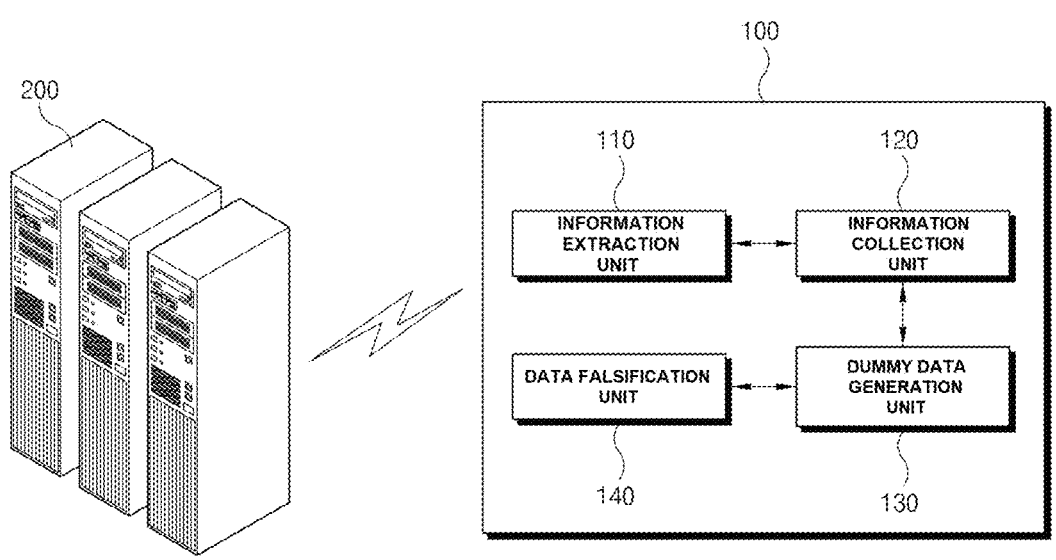
FIG. 1 is a schematic block diagram of an apparatus for protecting personal information leaked by a phishing application according to an embodiment of the present invention.

FIG. 1 is a schematic block diagram of an apparatus for protecting personal information leaked by a phishing application according to an embodiment of the present invention.

As illustrated in FIG. 1, an apparatus 100 for protecting personal information leaked by a phishing application according to an embodiment of the present invention is intended to protect, when personal information such as customer's photos, SNS information, text messages, messenger contents, and contact information is leaked through the phishing application, the leaked personal information by preventing further leakage by neutralizing the leaked personal information.

The apparatus 100 for protecting personal information leaked by the phishing application according to an embodiment of the present invention includes an information extraction unit 110, an information collection unit 120, a dummy data generation unit 130 and a data falsification unit 140.

Figure 2:
FIGS. 2 to 4 are diagrams illustrating examples of extracted phishing server information.
Figure 3:
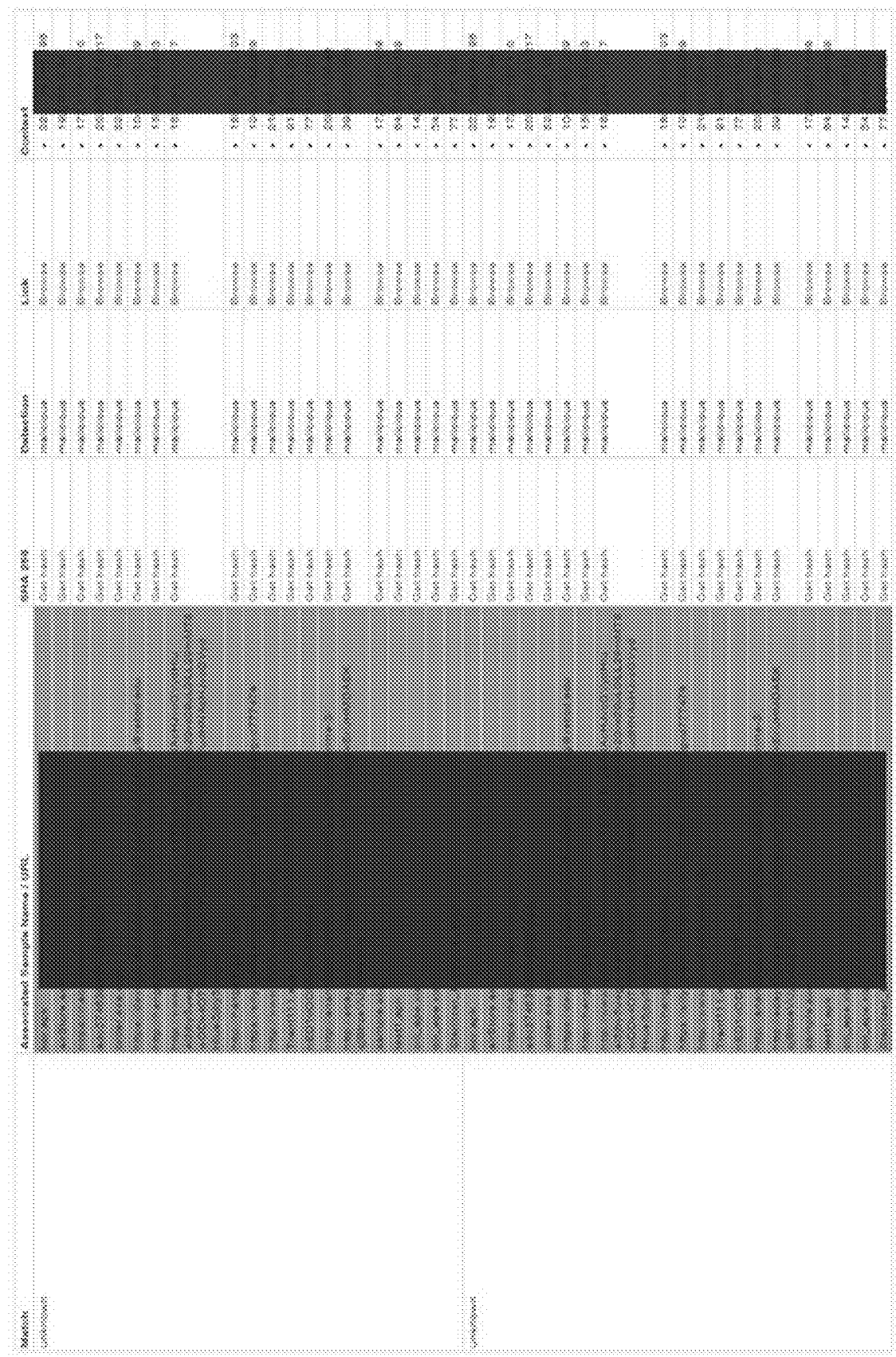
Figure 4:
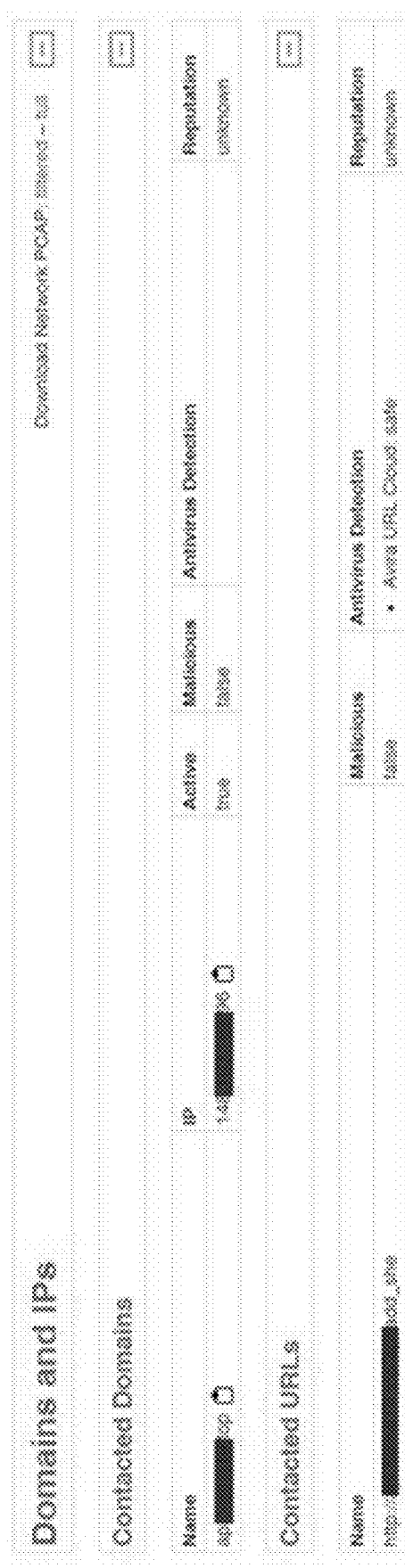

The information extraction unit 110 extracts phishing server information, which is server information of the phishing application installed in a customer terminal, as illustrated in FIGS. 2 to 4 by decompiling a file related to the phishing application from which personal information was leaked. FIGS. 2 to 4 illustrate examples of extracted phishing server information, which may include IP bands or site addresses used for transmission and reception.

The information extraction unit 110 extracts phishing server information by installing the phishing application on a separate smart phone and performing decompiling, for example. The phishing server information may include at least one of virtual private server (VPS) information, command & control (C&C) server information, an IP address, an access route, and log transmission contents. It is known that most of the phishing servers 200 that causes personal information to be leaked are command & control (C&C) servers, and most of the phishing servers 200 are implemented in such a way that they access the C&C server by connecting through the VPS server.

The information collection unit 120 accesses the phishing server 200 through the phishing server information, scans information included in a database, and collects customer-related information.

The customer-related information collected by the information collection unit 120 may include at least one of GPS location information, phishing time information, customer's phone number, international mobile equipment identity (IMEI) of a customer's terminal, SMS data of the customer's terminal, photo stored in the customer's terminal, and contacts. The information collecting unit 120 collects the customer-related information in a manner of checking whether or not the information is matched with customer information and collecting matching information. For example, a method of scanning whether or not there is a customer's phone number among all victimized phone numbers and collecting related information when there is the customer's phone number may be used. In addition, various methods known to those skilled in the art may be used.

Figure 6:
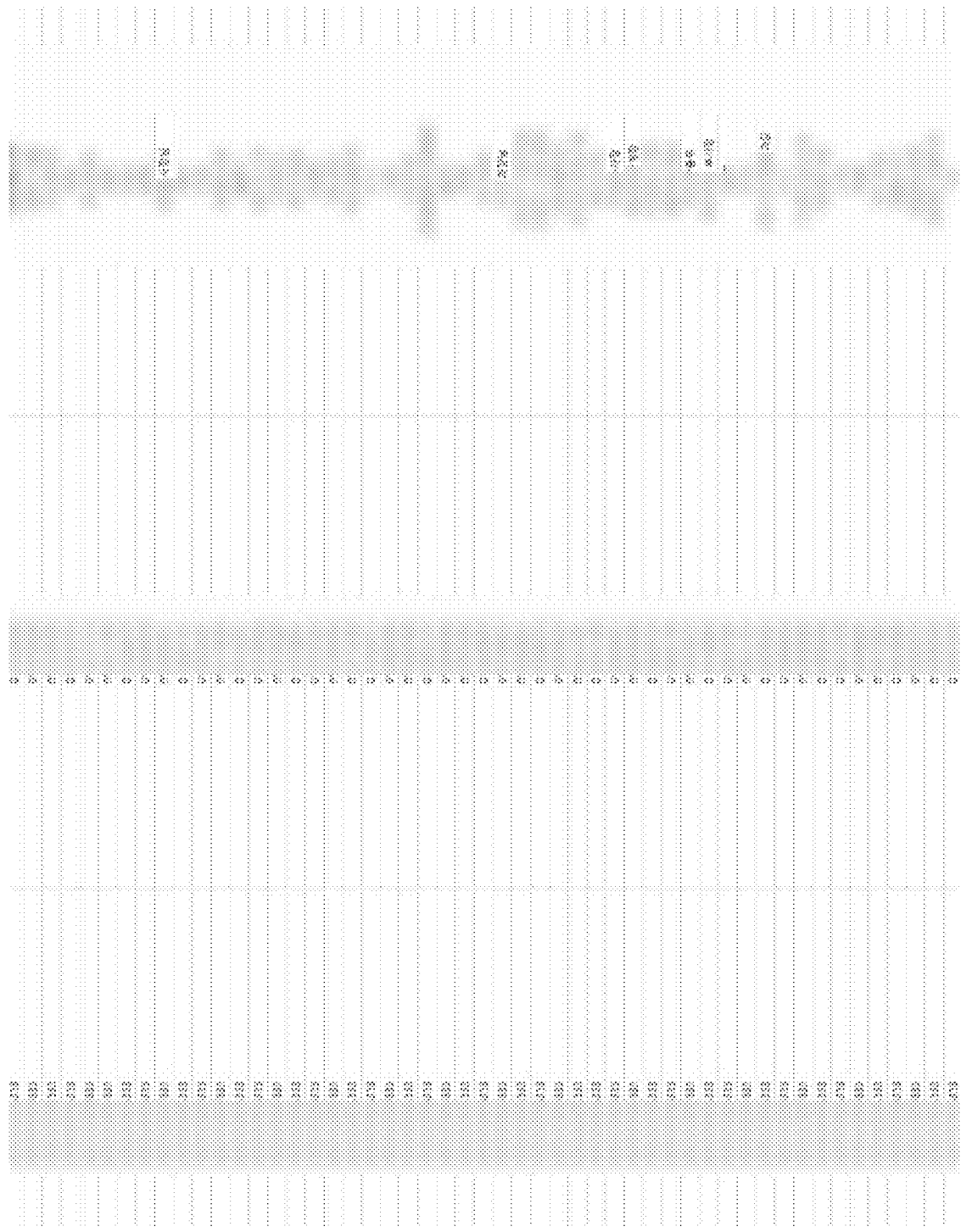
Figure 7:
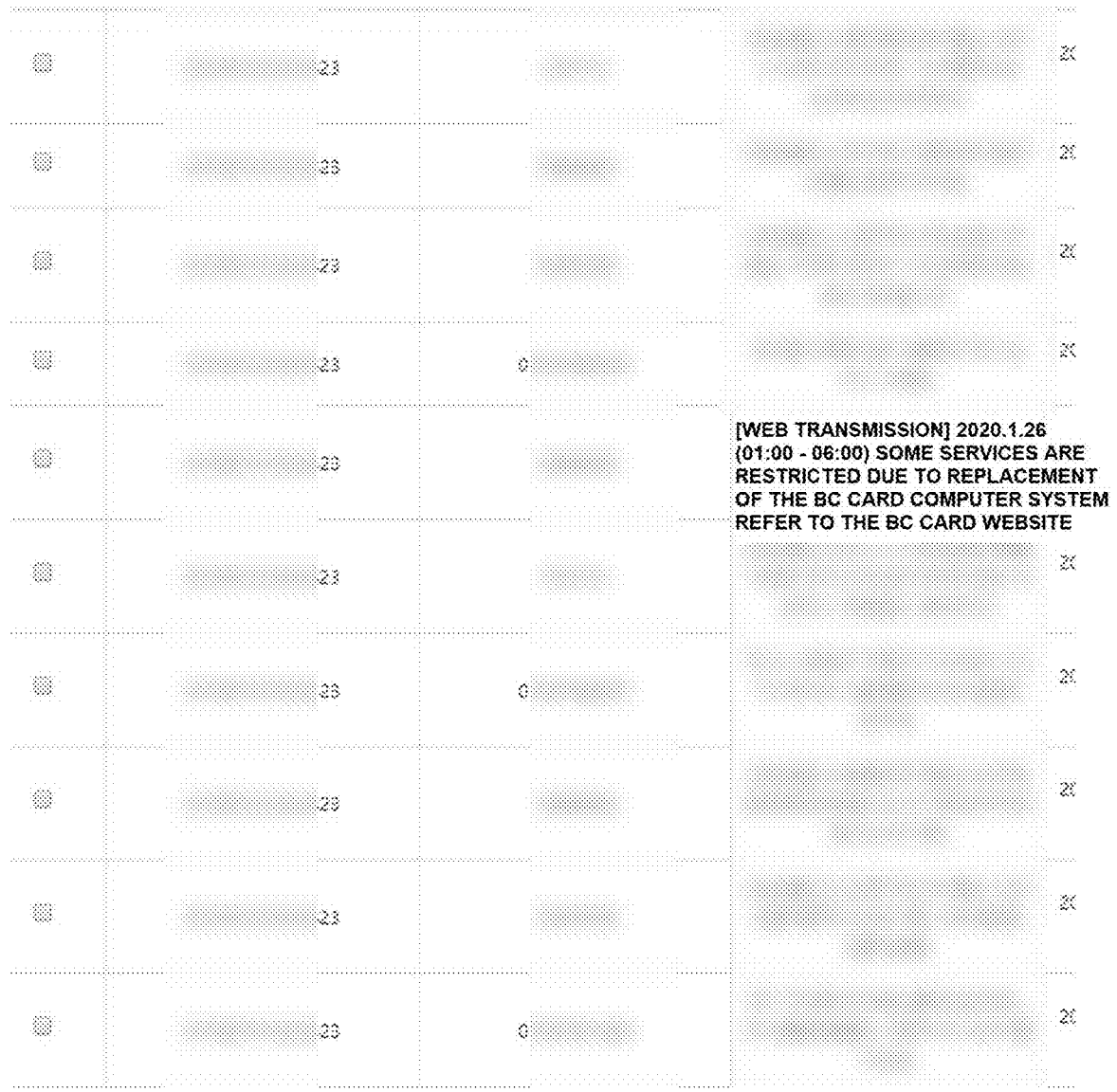

The collection of customer-related information can be checked as illustrated in FIG. 5 through the decompiling, and it is possible to collect leaked information such as contact information as illustrated in FIG. 6 or SMS text message information as illustrated in FIG. 7 through a collection process such as searching or scanning data of the phishing server, and checking divided files.

The collection of the customer-related information may be performed by a method of crawling related data in the database of the phishing server 200.

The dummy data generation unit 130 generates dummy data by performing falsification with random data so as to conform to a data format of the database of the phishing server based on the customer-related information collected through the information collection unit 120.

The dummy data may include at least one of a photo in which it is impossible to discern or identify who it is, contacts in unused phone number format, a document containing meaningless content, unidentifiable SMS data, falsified phishing time information, and an international mobile equipment identity of a falsified customer terminal. For example, if there is a photo file, dummy data is generated with a photo file in which it is impossible to discern or identify who it is, and, in the case of contacts, it is possible to generate dummy data in the form of phone numbers of combinations that are not used or are unlikely to be used, for contacts that can actually be used. In the case of IMEI, which is the international mobile equipment identity of the customer terminal, it is possible to generate dummy data by converting the IMEI by the IMEI Changer.

The data falsification unit 140 neutralizes personal information leakage by transmitting the dummy data to the phishing server so that customer's personal information is replaced with the dummy data or so that the dummy data is combined with the leaked customer's personal information to falsify the leaked customer's personal information.

For example, in most general data processing methods, data is stored in a last in first out (LIFO) scheme. In other words, since a server or the like uses a data processing method in which information recorded last in time is read first, it is possible to push out leaked original data to be replaced by transmitting a larger amount of dummy data than the amount of stored data or more dummy data larger than a storage capacity to the phishing server 200. Taking contacts as an example, since the number of contacts rarely exceeds 10000 in the case of most victims, since most victims rarely have more than 10000 contacts, in a case where the number of formats of a data array is 10000 or more, when it is configured in a LIFO format to save the next incoming data and delete the data thereafter, if 50000 contacts are generated as dummy data and transmitted to the phishing server 200 to be inserted thereinto, only the last 10000 contacts that come in are stored and the remaining contacts are deleted. Accordingly, contact information, which is the original data leaked first, is deleted from the phishing server 200.

In addition, it is possible to replace the contact information by overwriting the original data of the phishing server 200. For example, it is possible to generate dummy data having the same file name as the leaked original data and transmit it to the phishing server 200 to replace the leaked original data with the dummy data by overwriting the leaked original data.

In addition, various methods may be applied, including a method of preventing the phishing server 200 from recognizing the leaked original data by transmitting dummy data, a method of making the phishing server 200 mistakenly believe that that other victims' personal information has been leaked by transmitting dummy data, a method of making the phishing server 200 mistakenly believe that there is no leaked data by transmitting dummy data, etc.

Hereinafter, a method for protecting leaked personal information using the apparatus 100 for protecting personal information leaked by the phishing application described above will be described.

Figure 8:
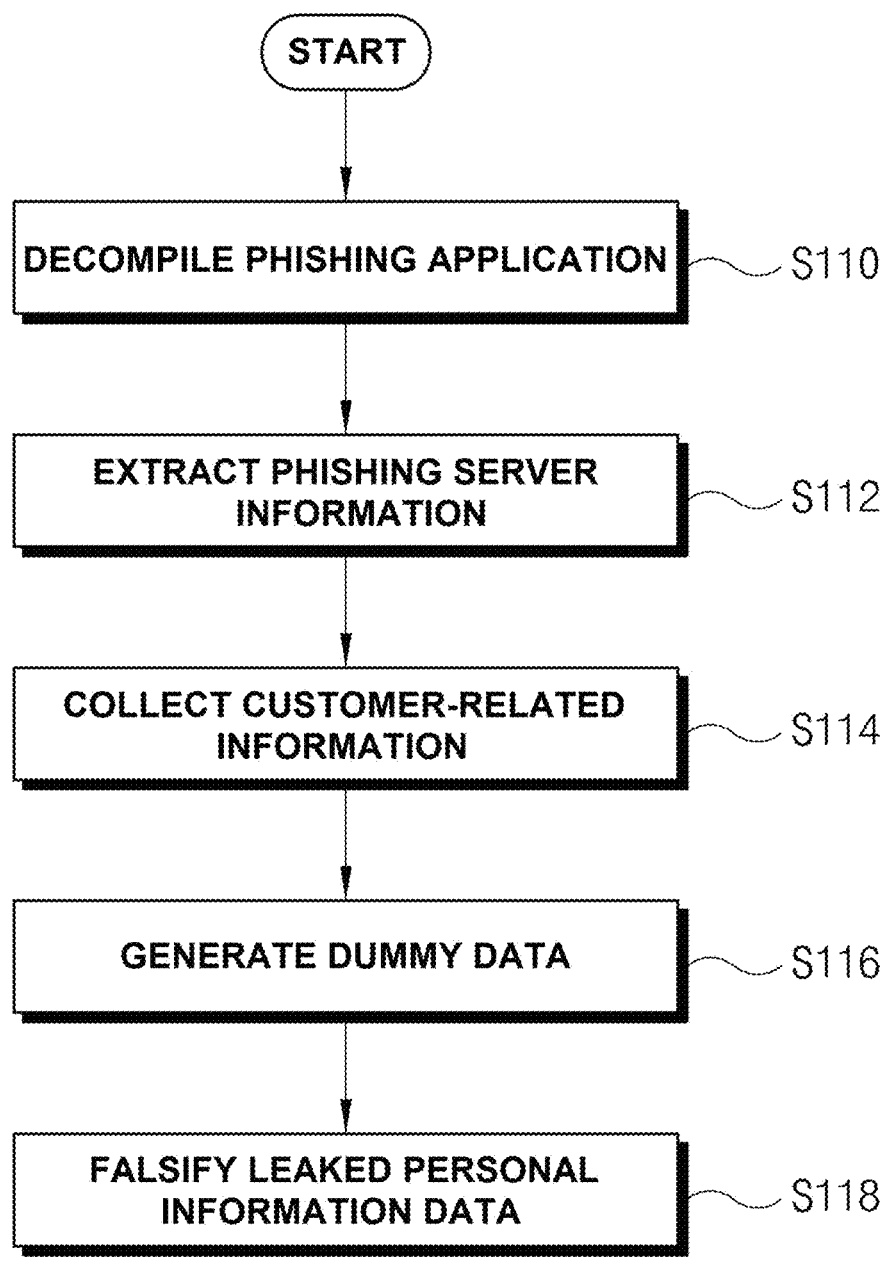
FIG. 8 is an operation flowchart of the apparatus for protecting personal information of FIG. 1.

FIG. 8 is an operation flow chart of the apparatus 100 for protecting personal information leaked by the phishing application.

As illustrated in FIG. 8, a method for preventing leakage of personal information using the apparatus 100 for protecting personal information leaked by the phishing application is to prevent additional leakage of personal information of a customer from the phishing server 200 to another server or the outside when the personal information is leaked to the phishing server 200 by the phishing application. The method for preventing leakage of personal information according to the present invention is preferably performed as soon as possible (within 30 minutes) from the time when the customer's personal information is leaked by the phishing application.

First, files related to the phishing application installed in the customer terminal from which personal information was leaked are decompiled (S110), and phishing server information, which is server information of the phishing application, is extracted as illustrated in FIGS. 2 to 4 (S112). FIGS. 2 to 4 illustrates examples of extracted phishing server information, which may include IP bands or site addresses used for transmission and reception.

The information extraction unit 110 extracts phishing server information by installing the phishing application on a separate smart phone and performing decompiling, for example. The phishing server information may include at least one of virtual private server (VPS) information, command & control (C&C) server information, an IP address, an access route, and log transmission contents. It is known that most of the phishing servers 200 that causes personal information to be leaked are command & control (C&C) servers, and most of the phishing servers 200 are implemented in such a way that they access the C&C server by connecting through the VPS server.

Next, the phishing server 200 is accessed through the extracted phishing server information, and information included in the database is scanned to collect customer-related information (S114).

The customer-related information may include at least one of GPS location information, phishing time information, customer's phone number, international mobile equipment identity (IMEI) of a customer's terminal, SMS data of the customer's terminal, photo stored in the customer's terminal, and contacts.

The collection of customer-related information can be checked as illustrated in FIG. 5 through the decompiling, and it is possible to collect leaked information such as contact information as illustrated in FIG. 6 or SMS text message information as illustrated in FIG. 7 through a collection process such as searching or scanning data of the phishing server, and checking divided files.

The collection of the customer-related information may be performed by a method of crawling related data in the database of the phishing server 200.

Next, dummy data is generated by performing falsification with random data so as to conform to the data format of the database of the phishing server 200 based on the collected customer-related information (S116).

The dummy data may include at least one of a photo in which it is impossible to discern or identify who it is, contacts in unused phone number format, a document containing meaningless content, unidentifiable SMS data, falsified phishing time information, and an international mobile equipment identity of a falsified customer terminal. For example, if there is a photo file, dummy data is generated with a photo file in which it is impossible to discern or identify who it is, and, in the case of contacts, it is possible to generate dummy data in the form of phone numbers of combinations that are not used or are unlikely to be used, for contacts that can actually be used. In the case of IMEI, which is the international mobile equipment identity of the customer terminal, it is possible to generate dummy data by converting the IMEI by the IMEI Changer.

After that, personal information leakage is neutralized by transmitting the dummy data to the phishing server 200 so that customer's personal information is replaced with the dummy data or so that the dummy data is combined with the leaked customer's personal information to falsify the leaked customer's personal information (S118).

For example, in most general data processing methods, data is stored in a last in first out (LIFO) scheme. That is, since a server or the like uses a data processing method in which information recorded last in time is read first, it is possible to push out leaked original data to be replaced by transmitting a larger amount of dummy data than the amount of stored data or more dummy data larger than a storage capacity to the phishing server 200.

In addition, it is possible to replace the contact information by overwriting the original data of the phishing server 200. For example, it is possible to generate dummy data having the same file name as the leaked original data and transmit it to the phishing server 200 to replace the leaked original data with the dummy data by overwriting the leaked original data.

In addition to this, various methods may be applied, including a method of preventing the phishing server 200 from recognizing the leaked original data by transmitting dummy data, a method of making the phishing server 200 mistakenly believe that that other victims' personal information has been leaked by transmitting dummy data, a method of making the phishing server 200 mistakenly believe that there is no leaked data by transmitting dummy data, etc.

As described above, according to the present invention, there is an advantage in that, even if personal information is temporarily leaked by the phishing application, leakage of personal information can be prevented and the leaked personal information can be protected by replacing or falsifying the leaked personal information with dummy data in a short time.

The description of the embodiment described above is merely an example with reference to the drawings for a more thorough understanding of the present invention, and should not be construed as limiting the present invention. In addition, it will be clear to those skilled in the art that various changes and modifications may be made thereto within the scope not departing from the basic principles of the present invention.

The invention claimed is:

1. A method for protecting personal information leaked by a phishing application, the method comprising:
   a first step of extracting phishing server information, which is server information of the phishing application installed in a customer terminal, by decompiling a file related to the phishing application from which personal information was leaked;
   a second step of collecting customer-related information by accessing a phishing server through the phishing server information and scanning information included in a database;
   a third step of generating dummy data by performing falsification with random data so as to conform to a data format of the database of the phishing server based on the collected customer-related information; and
   a fourth step of neutralizing personal information leakage by transmitting the dummy data to the phishing server so that customer's personal information is replaced with the dummy data or so that the dummy data is combined with the leaked customer's personal information to falsify the leaked customer's personal information.

2. The method of claim 1, wherein
the phishing server information includes at least one of virtual private server (VPS) information, command & control (C&C) server information, an IP address, an access route, and log transmission contents.

3. The method of claim 1, wherein
in the second step, the collecting the information related to the customer is performed in a manner of checking whether or not the information is matched with customer information including at least one of GPS location information, phishing time information, customer's phone number, international mobile equipment identity (IMEI) of a customer's terminal, SMS data of the customer's terminal, photo stored in the customer's terminal, and contacts and collecting matching information.

4. The method of claim 1, wherein
the dummy data includes at least one of a photo in which it is impossible to identify a person, contacts in unused phone number format, a document containing no substantive content, unidentifiable SMS data, falsified phishing time information, and an international mobile equipment identity of a falsified customer terminal.

5. An apparatus for protecting personal information leaked by a phishing application, the apparatus comprising:
   one or more units being configured and executed by a processor, the one or more units comprising;
   an information extraction unit that extracts phishing server information, which is server information of the phishing application installed in a customer terminal, by decompiling a file related to the phishing application from which personal information was leaked;
   an information collection unit that collects customer-related information by accessing a phishing server through the phishing server information and scanning information included in a database;
   a dummy data generation unit that generates dummy data by performing falsification with random data so as to conform to a data format of the database of the phishing server based on the collected customer-related information; and
   a data falsification unit that neutralizes personal information leakage by transmitting the dummy data to the phishing server so that customer's personal information is replaced with the dummy data or so that the dummy data is combined with the leaked customer's personal information to falsify the leaked customer's personal information.

6. The apparatus of claim 5, wherein
the phishing server information includes at least one of virtual private server (VPS) information, command & control (C&C) server information, an IP address, an access route, and log transmission contents.

7. The apparatus of claim 5, wherein
in the information collection unit, the collection of information related to the customer is performed in a manner of checking whether or not the information is matched with customer information including at least one of GPS location information, phishing time information, customer's phone number, international mobile equipment identity (IMEI) of a customer's terminal, SMS data of the customer's terminal, photo stored in the customer's terminal, and contacts and collecting matching information.

8. The apparatus of claim 5, wherein
the dummy data includes at least one of a photo in which it is impossible to identify a person, contacts in unused phone number format, a document containing no substantive content, unidentifiable SMS data, falsified phishing time information, and an international mobile equipment identity of a falsified customer terminal.

* * * * *